(12) United States Patent
Nagai et al.

(10) Patent No.: US 6,215,941 B1
(45) Date of Patent: Apr. 10, 2001

(54) OPTICAL DELAY TIME ADJUSTER AND OPTICAL TIME-DIVISION MULTIPLEXER

(75) Inventors: Kiyoshi Nagai; Yukihiro Ozeki, both of Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/248,324

(22) Filed: Feb. 11, 1999

(30) Foreign Application Priority Data

Feb. 12, 1998 (JP) .................................................. 10-030213

(51) Int. Cl.[7] ....................................................... G02B 6/00
(52) U.S. Cl. .......................... 385/136; 385/24; 359/140; 250/227.12
(58) Field of Search ................................ 385/136, 14, 24, 385/1, 12, 122, 132, 15, 16, 17, 42, 88; 359/123, 117, 118, 124, 133, 158, 161; 356/345, 350; 250/227.18

(56) References Cited

U.S. PATENT DOCUMENTS 5,111,322 * 5/1992 Bergano et al. ..................... 359/122
5,703,708 * 12/1997 Das et al. ............................. 359/140

OTHER PUBLICATIONS

Satoki Kawanishi and Masatoshi Saruwatari. "Time–division–multiplexed 100 Gbit/s optical transmission technology". Proceedings of the 1994 IEICE Spring Conference, Mar. 26–29, 1994, pp. 4–443–4–444.

* cited by examiner

Primary Examiner—Phan T. H. Palmer
(74) Attorney, Agent, or Firm—Rabin & Champagne

(57) ABSTRACT

An optical delay time adjuster and an optical time-division multiplexer. The delay time adjuster includes a support, an optical fiber attached to the support, and a device attached to the support which adjustably changes the length of the optical fiber. In various embodiments the device is an electric heater or cooling device or provides current to a piezoelectric element serving as the support. The optical time-division multiplexer includes an optical coupler which multiplexes optical signals received at its input ports, and the optical delay time adjuster connected to one of the input ports of the coupler.

6 Claims, 4 Drawing Sheets

OPTICAL DELAY TIME ADJUSTER AND OPTICAL TIME-DIVISION MULTIPLEXER

FIELD OF THE INVENTION

The present invention relates to an optical delay time adjuster that can be employed in an optical time-division multiplexer.

BACKGROUND OF THE INVENTION

A conventional optical time-division multiplexer is described, for example, in Proceedings of the 1994 Spring Conference of the Institute of Electronics, Information and Communication Engineers, pp. 4-443–4-444. An optical time-division multiplexer described in this publication has two optical fibers, including an optical delay generator and an optical coupler. The two optical fibers connect two input ports of the multiplexer with the optical coupler. One of the two optical fibers is longer than the other one so that there is a delay in the arrival at the coupler of a signal in the longer fiber relative to the arrival of a signal in the shorter fiber;

In a conventional optical time division multiplexer, the delay time depends upon the lengths of optical fibers. However, the length of optical fibers expand or contract according to the surrounding temperature. Thus, the delay time also depends on the temperature. Therefore, a variation in the temperature will change the delay time and may thus introduce errors into the operation of a conventional optical time-division multiplexer, or any other device which relies upon the length of optical fibers to create a time delay.

SUMMARY OF THE INVENTION

It is therefore an object of the invention to provide an optical delay time adjuster which generates a controllable time delay, and an optical time-division multiplexer that includes the same.

According to the invention, the optical delay time adjuster includes an optical fiber and a means for adjusting the length of the fiber. In some embodiments, the delay time adjuster includes a support, an optical fiber attached to the support, and a heater or a cooling device such as a thermoelectric element attached to the support for changing the temperature of the support and thereby the optical fiber. By heating or cooling the optical fiber, the heater or cooling device controls the length and refractive index of the optical fiber, to thereby control the optical delay time provided by the optical fiber.

In another embodiment, the optical delay time adjuster includes a piezoelectic element. By applying a voltage to a piezoelectric element about which the optical fiber is wound, the fiber is mechanically stretched to increase the length and thereby the delay time according to the applied voltage.

BRIEF DESCRIPTION OF THE DRAWING

The objects and features of the invention will become more apparent from the considerate of the following detailed description taken in conjunction with the accompanying drawings in which.

DESCRIPTION OF THE PREFERRED EMBODIMENT

The First Embodiment

Figure 1:
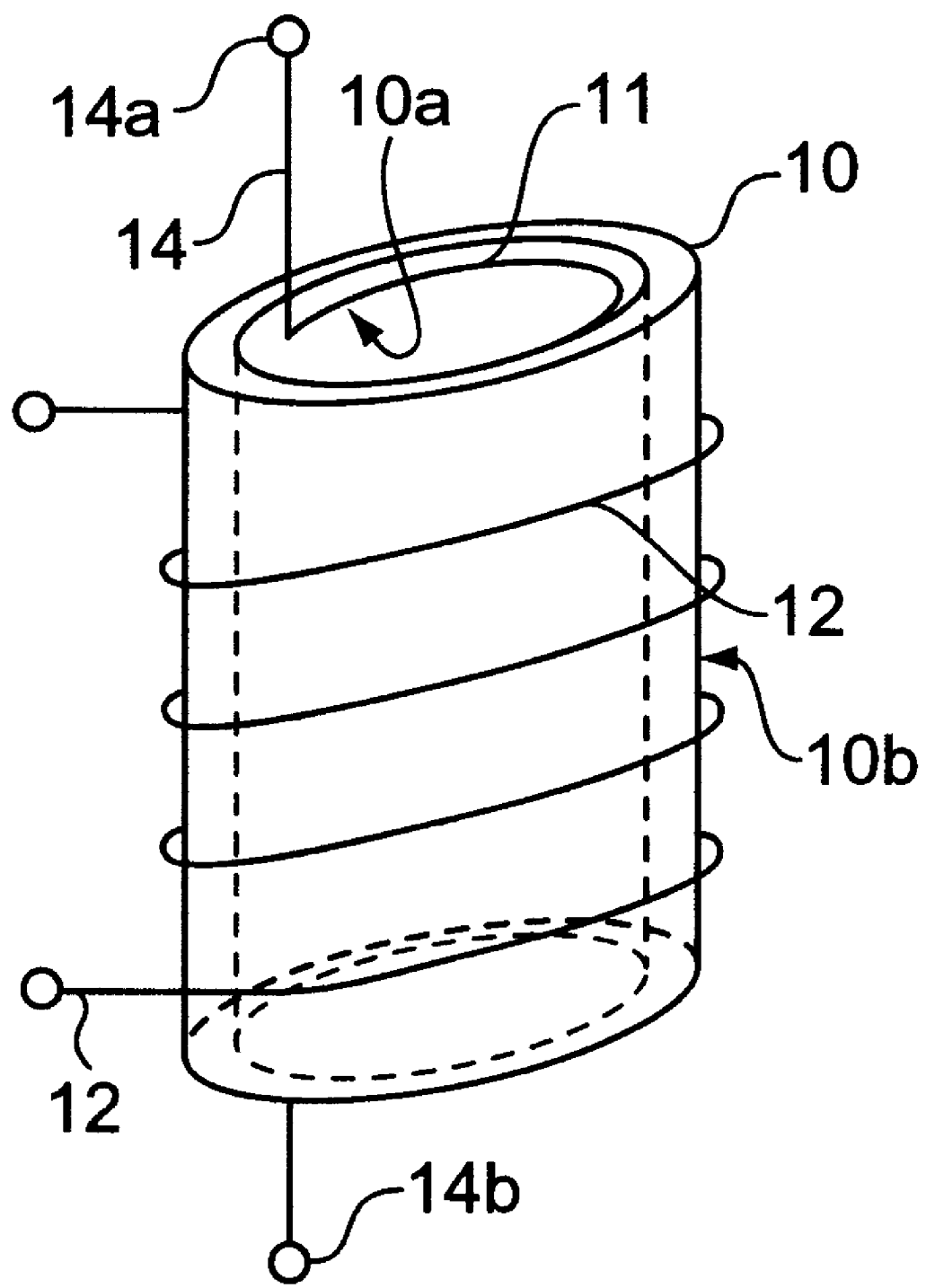
FIG. 1 is a schematic view of a first embodiment according to the invention.

Referring to FIG. 1, in the first embodiment of the invention an optical fiber 12 is wound over an outer cylindrical surface 10b of a cylindrical support 10, and a heater 14 in the form of heating coil, is attached spirally on an inner cylindrical surface 10a of the support 10. The cylindrical support 10 is formed of aluminum or other material which has a high rate of thermal expansion. The heater 14 has an upper terminal 14a and lower terminal 14b.

When an electric current flows though the heater 14, the cylindrical support 10 is heated and in turn heats the optical fiber 12. As a result, the cylindrical support 10 and the optical fiber 12 respectively expand, thus the length of the optical fiber 12 increases when heated, according to its coefficient of expansion. In addition, the heating causes a change of a refractive index of the optical fiber 12. The lengthening of the fiber and the change in its refractive index, both cause changes in the transmission line and thus the relative delay.

In this embodiment, by controlling the electric current for heating the optical fiber 12, it is possible to adjust the delay time of an optical signal which propagates through the optical fiber 12. When the temperature of an optical fiber 20 m in length is raised 10 degrees Celsius, the time for the optical signal to propagate through the optical fiber is increased by 24 ps.

The Second Embodiment

Figure 2:
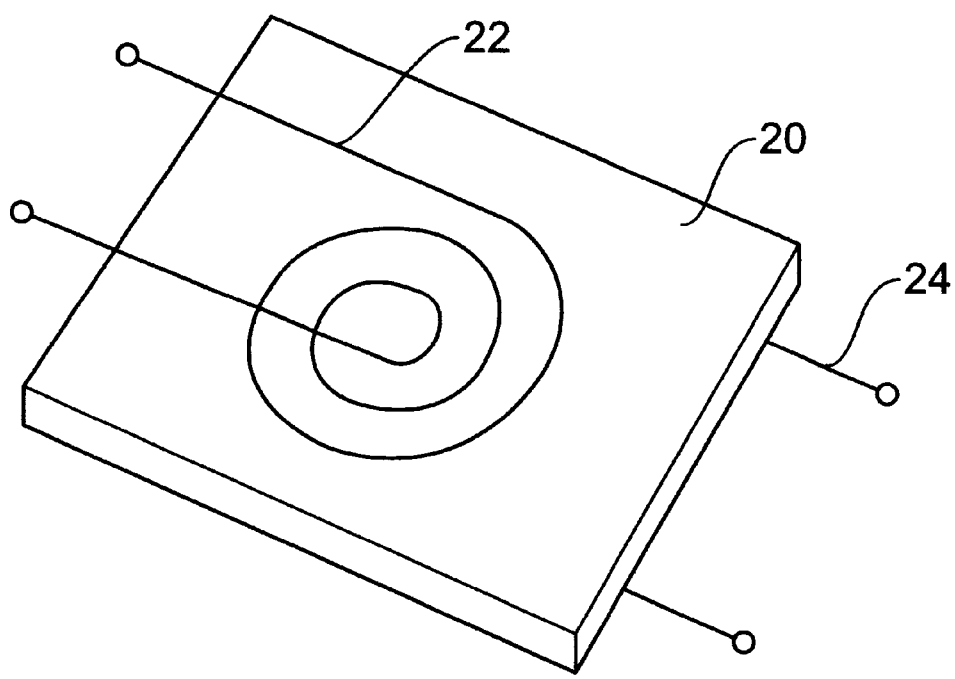
FIG. 2 is a schematic view of a second embodiment according to the invention.
Figure 3:
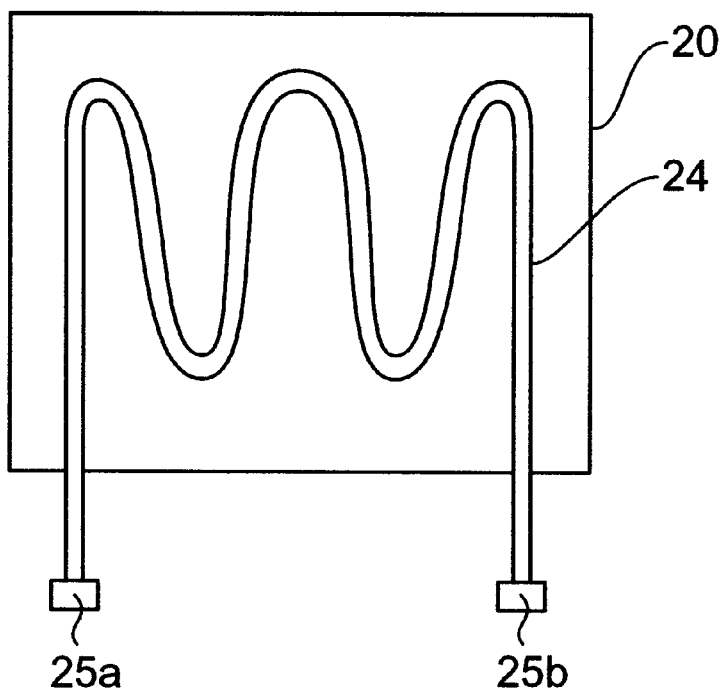
FIG. 3 is a schematic plan view of the second embodiment.

Referring to FIGS. 2 and 3, in the second embodiment of the invention, a support plate 20 is employed instead of the cylindrical support 10 of the first embodiment. The support plate 20 is foamed of, for example, aluminum or acrylic resin. An optical fiber 22 is laid in a single plane, for example spirally, on and attached to one planar side surface of the plate 20. A heater 24 in the form of an electrically conductive heating element having terminals 25a, 25b is laid in the shape of a wavy line on and attached to the other side surface of the plate 20.

When current flows through the heater 24, it heats the support plate 20, which in turn heats the optical fiber 22. As in the case of the first embodiment, the optical delay time introduced to the signal propagated tough the optical fiber is adjustable according to the degree of heating.

The Third Embodiment

Figure 4:
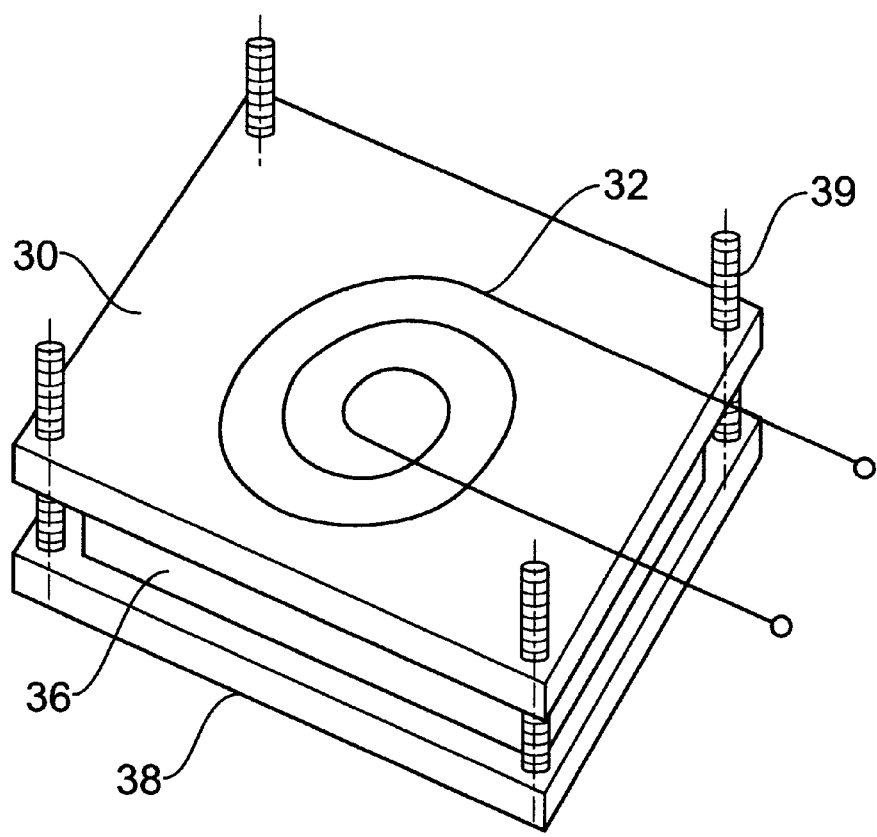
FIG. 4 is a schematic view of a third embodiment according to the invention.

Referring to FIG. 4, the optical delay time adjuster of the third embodiment of the invention employs a thermoelectric element 36 as both a cooling device and a heating device to control the temperature of a rectangular support plate 30. An optical fiber 32 is attached spirally as in the second embodiment shown in FIG. 2, on one side surface of the support plate 30. The thermoelectric element 36 is attached to the other side of the support plate 30. The thermoeletric element 36 is sandwiched between the support plate 30 and a rectangular heat sink plate 38. At each of four corners of both the support plate 30 and the heat sink 38, plastic screws are applied so as to fix a sandwich arrangement of those three components.

When an electric current flows through the thermoelectric element 36 in one direction, the support plate 30 is cooled and therefore the temperature of the optical fiber 32 is reduced. Alternatively, by reversing the direction of current applied to the thermoelectric element 36, the thermoelectric element 36 can be used as a heating device to heat the support plates and thereby raise the temperature of the optical fiber. Thus, in this embodiment, by controlling the electric current applied to the thermoelectric element 36 in both amplitude and direction, it is possible to adjust (increase or decrease) the delay time in the propagation of an optical signal through the optical fiber 32.

Since, according to the third embodiment described above, the temperature of the optical fiber 32 can be raised or lowered respectively by heating or cooling, a wider range of the delay times can be produced. In addition, as compared with the second embodiment employing the thermoelectric element of the third embodiment reduces the power consumption.

The Fourth Embodiment

Figure 5:
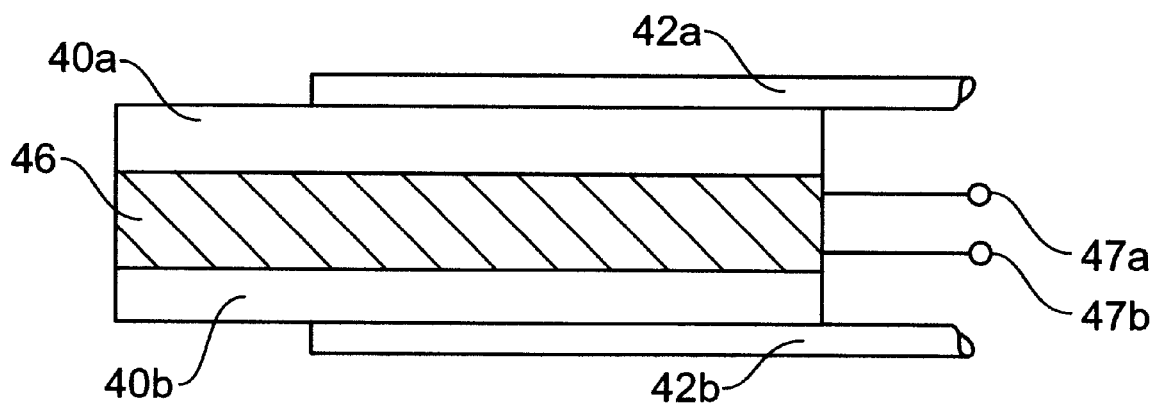
FIG. 5 is a schematic side view of a fourth embodiment according to the invention.

Referring to FIG. 5, the fourth embodiment of the invention also employs a thermoelectric element. A thermoelectric element 46 is sandwiched between first and second support plate 40a, 40b. A first optical fiber 42a is matched spirally as in the second and third embodiments shown in FIGS. 2 and 4, to an outer surface of the first support plate 40a. A second optical fiber 42b is similarly attached to an outer surface of the support plate 40b.

When a voltage is applied between terminals 47a, 47b of the thermoelectric element 46, one side of the thermoelectric element is cooled and the other side is heated. Therefore, it is possible to lower the temperature of the first support plate 40a while at the same time raising the temperature of the second support plate 40b. Thus, the first optical fiber 42a is cooled and therefore shortened so that the associated delay time is shortened, and the second optical fiber 42b is heated, and therefore lengthened, so that the range of relative delay time produced by the two fibers is increased relative to the first and second embodiments. Moreover, by reversing the direction of current applied to the thermoelectric element 46, the first support plate 40a and the first optical fiber 42a are heated and the second support plate 40b and the second optical fiber 42b are cooled. Therefore, the range of temperature differences between the two optical fibers, and therefore the range of differences in their lengths and thus the range of differences in the delay times they can produce, is twice that of the third embodiment in which only one optical fiber is heated or cooled.

The Fifth Embodiment

Figure 6:
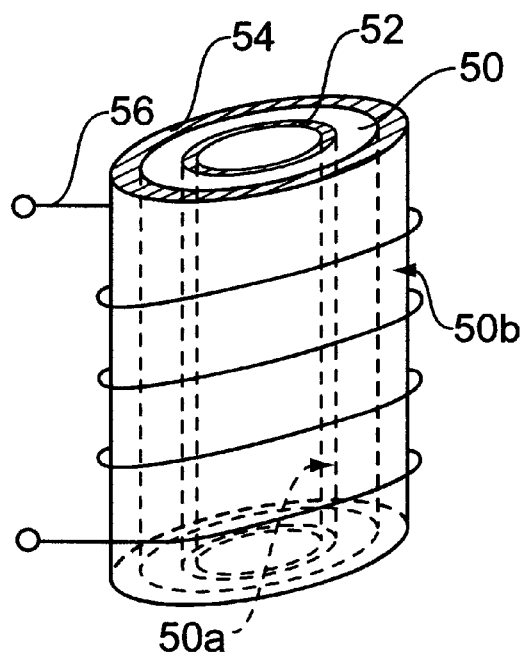
FIG. 6 is a schematic view of a fifth embodiment according to the invention.

Referring to FIG. 6, the fifth embodiment of the invention employs a cylindrical piezoelectric element 50 as a support. The piezoelectric element 50 is made of PZT (lead zirconate titanate), for example. An inner surface 50a and an outer surface 50b of the element 50 are respectively covered with electrodes in the form of an inner electrode layer 52 and an outer electrode layer 54. The electrode layers are formed of a conductive material such as a metal and are not required to cover at least portion of the inner or outer surfaces of the element 50. An optical fiber 56 is wound over the outer electrode 50b.

When a voltage is applied between the electrode layers 52, 54, a stress is developed in the piezoelectric element 50, so that its thickess is increased. As a result, the length of the optical fiber 56, and the delay time on propagation of an optical signal therethrough, are increased according to the voltage.

As will be noted, the fifth embodiment does not employ a heating or cooling device, as do the prior embodiments which continuously consumes energy. Rather the piezoelectric element of the fifth embodiment is driven by a constant voltage and therefore little energy is consumed.

The Sixth Embodiment

Figure 7:
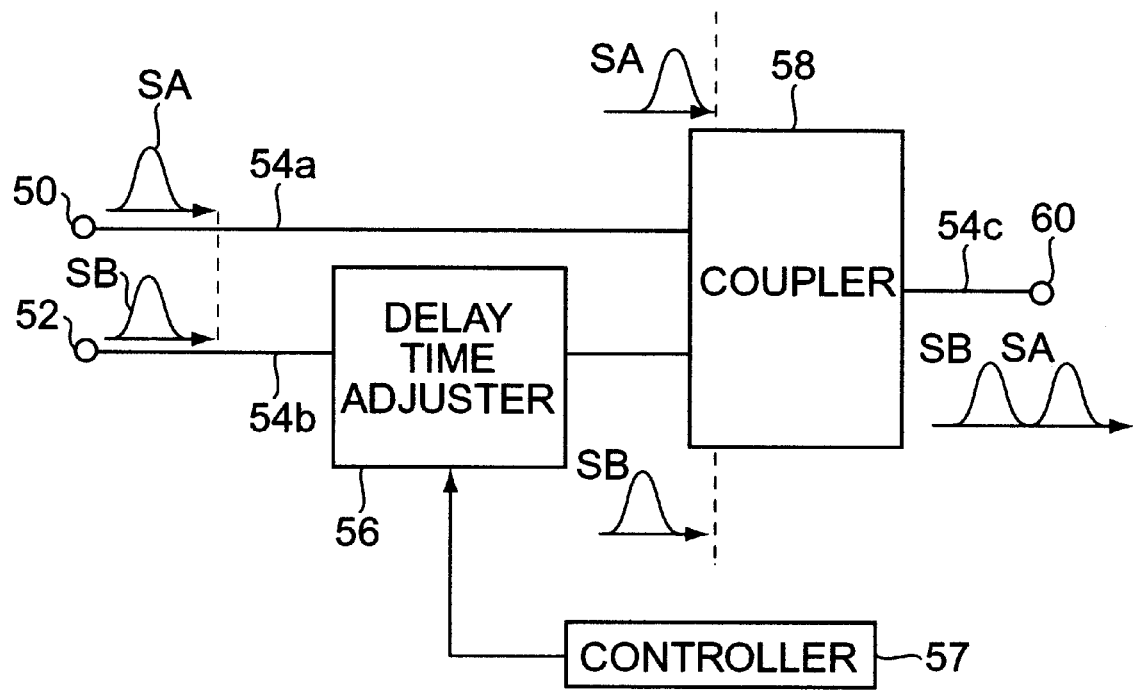
FIG. 7 is a schematic diagram of sixth embodiment according to the invention.

Referring to FIG. 7, one use of an optical delay time adjuster according to the invention, is in an optical time-division multiplexer. In FIG. 7, the multiplexer includes an optical coupler 58, an optical delay time adjuster 56 and a controller 57.

An optical signal SA from a first input port 50 propagates through a first optical fiber 54a and enters the optical coupler 58. An optical signal SB from a second input port 52 propagates through a second optical fiber 54b and enters the coupler 58 trough the optical delay adjuster 56. The optical signals are multiplexed by the optical coupler 58. The multiplexed signal then propagates through a third optical fiber 54c toward an output port 60.

The delay time adjuster 56 adds a delay time to the transmission of the optical signal SB. The delay time adjuster 56 may, for example, be any of the first, second, third and fifth embodiments of the delay adjuster described above. The delay time adjuster of the fourth embodiment shown in FIG. 5 may also be used in a multiplexer according to the invention. However, in this case, the time delay of both of the signals input to the coupler are adjustable.

The controller 57 controls the amount and/or dimrecton. of electric current or voltage applied to a heater, thennoelectric element or piezoelectric element of the delay time adjuster 56, according to the adjuster embodiment used. For example, if the adjuster employs a heater or the-nioelectric element, then the controller 57 may employ a thermistor which detects the temperature of the optical fiber 54b.

The optical time-division multiplexer includes the optical delay adjuster for adjusting the delay time of the optical signal before the optical signal enters the optical coupler. Therefore it is possible to multiplex the optical signals in an accurate manner.

In summary and as described above, the optical delay adjuster according to the invention changes the length or both the length and the refractive index, of an optical fiber, or in one embodiment each of two optical fibers, thereby to adjust the delay time in transmission of an optical signal therethrough. The various embodiments disclosed above perform this function by heating, cooling or mechanically stretching the optical fiber. In the latter case, the stretching is performed by a piezoelectric element. Such an optical delay time adjuster according to the invention may be used in an optical time-division multiplexer so as to adjust the delay time of the optical signal before it enters an optical coupler, thereby facilitating the multiplexing of optical signals as required.

While the invention has been described with reference to six embodiments thereof it will be understood by those skilled in the art that modifications thereof can be made without departing from the spirit and scope of the invention, and the invention includes all such modifications and variations, the scope of the invention to be limited only by the appended claims.

What is claimed is:

1. An optical time-division multiplexer, comprising:

an optical coupler having input ports and an outputs ports, said optical coupler multiplexing optical signals received through said input ports; and an optical delay time adjuster having at least a first optical fiber connected to said input ports of said optical coupler and means for controlling the length of at least said first optical fiber, wherein said means for controlling the length of said optical fiber includes a piezoelectric element and said optical fiber is wound about said piezoelectric element.

2. An optical time-division multiplexer, comprising:

an optical coupler having input ports and an outputs ports, said optical couple multiplexing optical signals received through said input ports; and an optical delay time adjuster having at least a first optical fiber connected to said input ports of said coupler and means for controlling the length of at least said first optical fiber, wherein said means for controlling the length of said optical fiber includes a thermoelectric element in heat transmissive contact with said optical fiber.

3. An optical delay time adjuster, comprising:

a support plate;

an optical fiber attached to a side surface of said support plate; and a thermoelectric element attached to another side surface of said support plate to control a temperature of said support plate.

4. An optical delay time adjuster, comprising:

first and second support plates;

a thermoelectric element between said first and second support plates to alternately heat and cool said first support plate and to alternately cool and heat said second support plate, simultaneously; and a first optical fiber in heat transmissive contact with a surface of said first support plate and a second optical fiber in heat transmissive contact with a surface of said second support plate.

5. An optical delay time adjuster, comprising:

a cylindrically-shaped piezoelectric element; and an optical fiber wound over said piezoelectric element, so as to lengthen in response to application of a voltage to said piezoelectric element.

6. An optical delay time adjuster according to claim 5, wherein said piezoelectric element includes electrode layers which cover, respectively, an inner and an outer surface of said piezoelectric element.

* * * * *